(12) United States Patent
Ahlgren et al.

(10) Patent No.: US 8,372,426 B2
(45) Date of Patent: *Feb. 12, 2013

(54) DIETARY FIBER COMPOSITION

(75) Inventors: Nils William Ahlgren, Redwood City, CA (US); Ronald Lee Dahl, Lincoln, NE (US); Monte Lee Friesen, Lincoln, NE (US); Alexander Mark Schobel, Whitehouse Station, NJ (US)

(73) Assignee: Novartis Consumer Health S.A., Nyon (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/231,173

(22) Filed: Sep. 13, 2011

(65) Prior Publication Data

US 2012/0003367 A1    Jan. 5, 2012

Related U.S. Application Data

(63) Continuation of application No. 11/057,480, filed on Feb. 14, 2005, now Pat. No. 8,062,659.

(60) Provisional application No. 60/546,298, filed on Feb. 20, 2004.

(51) Int. Cl.
*A61K 47/00* (2006.01)
*A61K 9/20* (2006.01)
*A01N 43/04* (2006.01)
*A23L 1/308* (2006.01)
*A23P 1/02* (2006.01)

(52) U.S. Cl. .......... 424/439; 424/464; 514/54; 426/285; 426/648

(58) Field of Classification Search .................. 424/439, 424/464; 514/54; 426/285, 648
See application file for complete search history.

(56) References Cited

U.S. PATENT DOCUMENTS

| | | | |
|---|---|---|---|
| 4,393,086 A | 7/1983 | Masuyama | |
| 4,680,189 A | 7/1987 | Schumacher et al. | |
| 5,260,279 A | 11/1993 | Greenberg | |
| 6,455,068 B1 | 9/2002 | Licari | |
| 6,495,177 B1 | 12/2002 | Valentine et al. | |
| 8,062,659 B2 * | 11/2011 | Ahlgren et al. | 424/439 |
| 2002/0031552 A1 * | 3/2002 | McTeigue et al. | 424/490 |

FOREIGN PATENT DOCUMENTS

| | | |
|---|---|---|
| EP | 0 452 262 | 10/1991 |
| GB | 2 030 583 | 4/1980 |
| WO | WO 95/06417 | 3/1995 |
| WO | WO 00/28973 | * 5/2000 |

* cited by examiner

*Primary Examiner* — Aradhana Sasan
(74) *Attorney, Agent, or Firm* — Larson & Anderson, LLC

(57) ABSTRACT

The present invention provides a chewable composition containing granules of water-soluble dietary fiber. The chewable composition has highly agreeable organolpetic properties and is consumable without the need of an ingestion aid.

14 Claims, No Drawings

DIETARY FIBER COMPOSITION

This application is a continuation of U.S. 11/057,480 filed on Feb. 14, 2005, now U.S. Pat. No. 8,062,659, which claims the benefit of Provisional Application 60/546,298, filed Feb. 20, 2004, the contents of which are hereby incorporated by reference in their entirety.

The present invention relates to a dietary fiber product. More particularly, the present invention relates to a chewable dietary fiber product that is readily consumable and provides agreeable organoleptic properties.

BACKGROUND OF THE INVENTION

Dietary fibers are complex carbohydrate polymers found in plants, which are not digested by the human digestive system, and the fibers are broadly divided into water-soluble and water-insoluble groups. Although dietary fiber is not considered an essential nutrient, a high dietary fiber intake may reduce the risk of several chronic diseases. A diet having 20-35 grams of dietary fiber a day is highly recommended. However, a typical diet of Western countries tends to provide sufficiently less than the recommended amount of dietary fiber. As a result, a variety of dietary fiber supplements are commercially available. Although powder dietary fiber products are available, which are dissolved in water or other liquid drink, such products are not easily portable and may not be a desirable way to ingest the fiber for some.

There are different forms of edible products that are designed as supplementary source of dietary fibers. For example, snack bars, cereal and cookies that contain dietary fibers are commercially-available. Additionally, chewable tablets and swallowable pills containing dietary fibers are available. A chewable tablet is a highly desirable mode for delivering dietary fibers since it is easily portable and can be ingested without the need of an ingestion aid, e.g., water. However, a chewable tablet must have agreeable organoleptic properties.

One example of a chewable fiber tablet is described in U.S. Pat. No. 6,455,068. The patent discloses a chewable product that contains inulin or fructooligosaccharide fiber and is produced by compression molding a dry mixture of dry blended ingredients including inulin or fructooligosaccharide. Although fiber tablets can be produced as thought by the patent, the dry compression process does not always provide organoleptically agreeable chewable products when dietary fibers other than the disclosed dietary fibers are used.

SUMMARY OF THE INVENTION

The present invention provides a chewable fiber composition containing compressed granules. The granules are produced from a water-soluble dietary fiber, and the granules have a size distribution of less than 10% by weight of granules having larger than 850 μm (20 mesh) and less than 35% by weight of granules having smaller than 75 μm (200 mesh). Additionally provided is a chewable fiber composition containing compression molded agglomerated granules of guar gum fibers. Desirably, at least 50 weight % (wt %) of the dietary fibers of the granules of the chewable composition is partially hydrolyzed guar gum fiber. An exemplary chewable composition of the present invention contains between 40 wt % and 60 wt % of water-soluble fiber, between 5 wt % and 15 wt % of sucrose, between 5 wt % and 15 wt % of maltodextrin, between 15 wt % and 25 wt % of sorbitol, between 5 wt % and 10 wt % of dextrate, between 0.1 wt % and 0.4 wt % of an artificial sweetener, e.g., sucralose or saccharin, and other ingredients, such as lubricants, flavorants and colorants. The present invention further provides a process for producing a chewable fiber composition. The production process has the steps of blending fiber ingredients including water-soluble fiber to produce a fiber mixture; granulating the fiber mixture by supplying fine spray of a granulating agent to form wet granules having a moisture content between 8 wt % and 17 wt %, based on the total weight of the granule; drying the wet granules to from dry granules; screening the dry granules using a screen having a mesh size between 500 μm (35 mesh) and 710 μm (25 mesh) to separate small granules and large granules; milling the large granules to form milled granules; mixing the small granules and the milled granules to form mixed granules; and compression molding the mixed granules to from the chewable fiber composition, wherein the chewable fiber composition has a hardness between 10 kiloponds (kp) and 20 kp.

The chewable fiber composition can be provided in variety of chewable forms including a tablet or wafer. The chewable composition provides pleasant organoleptic properties when masticated, and does not require water or other drinks to ingest.

DETAILED DESCRIPTION OF THE INVENTION

The chewable composition of the present invention contains compression molded granules of water-soluble dietary fibers. The granules of the chewable composition have a size distribution profile that results in pleasing organoleptic properties, unlike other chewable fiber supplements that can be hard to chew or give viscid texture when masticated.

Dietary fibers suitable for the present chewable composition are water-soluble fibers, although minor amounts of water-insoluble fibers can be added. The chewable fiber composition contains between 30 wt % and 90 wt %, desirably between 35 wt % and 75 wt %, more desirably at least 40 wt % and 60 wt %, most desirably between 45 wt % and 55 wt %, of to water-soluble fiber. Particularly suitable water-soluble dietary fibers for the present invention are water-soluble fibers that impart a relatively small increase in viscosity when dissolved in water. It has been found that a low viscosity increasing water-soluble fiber avoids undesirable organoleptic properties, such as gelling in the mouth when masticated. Particularly suitable dietary fibers, when dissolved in water at room temperature, form a 10 wt % solution that has less than 100 cp at room temperature, preferably less than 50 cp, and more preferably less than 25 cp. Suitable dietary fibers include guar gum, inulin, and fructooligosaccharide, arabinogalactan and mixtures thereof. More specifically, suitable guar gum fiber is partially hydrolyzed guar gum, and suitable inulin and fructoologosaccharide are low molecular weight having a degree of polymerization less than 60, preferably less than 30. Particularly desirable inulin has an average degree of polymerization less than 20 monomeric fructose units, and fructooligosaccharide has an average degree of polymerization less than 8 fructose units. Of these suitable water-soluble fibers, especially desired is partially hydrolyzed guar gum dietary fiber. Partially hydrolyzed guar gum dietary fiber is commercially available from Novartis Consumer Health under the trademark BENEFIBER®. The guar gum fiber is produced by partially hydrolyzing guar gum to reduce its average molecular weight to around one tenth of unmodified guar gum. The partially hydrolyzed guar gum fiber does not significantly increase the viscosity of water or other aqueous liquid even when the daily recommended amount of the dietary fiber is dissolved in a readily consumable amount of liquid. Preferred partially hydrolyzed guar gum is purified guar gum prepared by controlled enzymatic hydrolysis of guar gum. Prior to hydrolysis, the molecular weight of guar gum is approximately 200,000, and after hydrolysis, it is 15,000 to 35,000, preferably 20,000 to 30,000.

The chewable composition of the present invention is produced by using a wet granulation process. In general, a conventional wet granulation process forms granules by wetting a powder material with an aqueous composition of a granulating agent to cause the powder to agglomerate to form wet agglomerated granules. Unlike the conventional granulating process, which supplies a large volume of the liquid granulating agent to from a large cohesive, deformable, plastic mass that is later divided into small granules, the present wet granulation process supplies a limited amount of the liquid granulating agent, which is supplied as a fine spray, to form small granules. A preferred granulation process uses a high shear granulator, e.g., Oattersin-Kelly Liquids/Solids granulator, TK Fielder mixer/granulator, Collette High Shear mixer/granulator or Lodige mixer/granulator, and supplies a fine spray of the liquid granulating agent, e.g., water. The granulator prepares a dry mixture of dietary fiber and other dry ingredients, if needed, such as a binder, e.g., lactose, sucrose, maltodextrin, starch, polyethylene glycol, gums, hypromellose, methylcellulose or microcrystalline cellulose. The binder can be supplied as a powder form mixed with the dry mixture or dissolved in the liquid granulating agent. The powder mixture is then agglomerated by supplying a fine spray of the liquid granulating agent while applying high shear to the mixture of the dietary fiber composition ingredients.

Desirably, the fine spray of the liquid granulating agent is applied the powder mixture with a fully aspirated fan-type flat nozzle, e.g., nozzle number 9508, and the moisture content of the produced wet granules is between 8 wt % and 17 wt %, preferably between 10 wt % and 15 wt %, based on the total weight of the wet granule. The wet agglomerated granules are collected from the granulator and dried using, e.g., a fluid bed dryer until the moisture content of the granules are between 0.05 wt % and 4 wt %, preferably between 0.75 wt % and 3.5 wt %, and more preferably between 0.1 wt % and 3 wt %. Any suitable temperature that does not cause thermal decomposition of the ingredients can be used to dry the granules.

In accordance with the present invention, the dried granules are collected and screened using a mesh screen to separate small granules from large granules. A suitable screen size for the initially screening step is between about 500 μm (35 mesh) and about 710 μm (25 mesh). A particularly suitable screen size is about 600 μm (30 mesh). The fine granules that pass through the screen are collected, and the large granules left on the screen are separately collected and milled using a conventional milling machine, e.g., Fitzmill, which is equipped with a screen of about 710 μm (25 mesh) to about 1000 μm (18 mesh), desirably about 850 μm (20 mesh). Once the milling process is completed, the initially screened granules and the milled granules are combined and mixed with other ingredients that are conventionally used to produce chewable products, e.g., tablets, to form a granule mixture using a mixer, e.g., tumble mixer or v-blender. Other ingredients suitable for the chewable composition include fillers, binders, excipients, sweeteners, flavorants, lubricants and the like, as further discussed below. The granule mixture is then compression molded to form the chewable composition using, e.g., a conventional compression tablet molding press, e.g., Courtoy rotary press, Kilian tablet press, Manesty rotary press, Fette rotary press or Korsch rotary press. A desired tablet press is a rotary tablet press that compresses the granule mixture to a tablet of a hardness of 10-20 kp, preferably 12-15 kp, as measured by a tablet hardness tester, e.g., VK 200 VanKel tablet hardness tester.

As discussed above, in addition to the main fiber ingredient, the chewable composition may contain other ingredients. Ingredients that facilitate the manufacture, improve the aesthetics and improve the organoleptic properties of the chewable composition can be added. These ingredients include stabilizer, colorants and fillers. Other materials that can also be added include fillers, e.g., compressible sugars, dextrose, sorbitol and mannitol; compression aids, e.g., microcrystalline cellulose and starch; binders, e.g., lactose, sucrose, maltodextrin, starch, polyethylene glycol, gums, hypromellose, methylcellulose or microcrystalline cellulose, lubricants, e.g., stearates; flavorants; natural sweeteners; and artificial sweetener. Flavoring agents well-known in the food and confection art may be added to the chewable fiber compositions. These flavoring agents may be chosen from synthetic flavor oils and/or those derived from natural fruits, plants, leaves, flowers and so forth, and combinations thereof. Suitable flavors are artificial, natural or synthetic fruit flavors, such as citrus oil including lemon, orange, grape, lime and grapefruit; and fruit essences including apple, apricot, strawberry, cherry, pineapple and so forth. Also useful are flavor oils, such as spearmint oil, cinnamon oil, oil of wintergreen (methylsalicylate) and peppermint oils. The chewable composition desirably contains at least one sweetening agent. The sweetening agent may be selected from a wide range of materials, including water-soluble sweetening agents, water-soluble artificial sweeteners, dipeptide based sweeteners and mixtures thereof. Additionally suitable ingredients are lubricants and release agents, such as magnesium stearate, stearic acid and polyethylene glycol.

In accordance with the present invention, the granules forming the chewable composition have a size distribution, which provides desirable organoleptic properties. It has been found that having very small granules and very large granules adversely effect the organoleptic properties of the chewable composition. If the particle size of the fiber granules forming the tablet is too large, it is perceived as gritty or sandy, whereas if it is too fine, the tablet is perceived as dry or dusty and gummy. Desirably, the chewable composition contains less than 10 wt %, based on the total weight of the chewable composition, preferably less than 7.5 wt %, more preferably less than 5 wt %, most preferably less than 4 wt %, of granules having particle size larger than 850 μm (20 mesh), and less than 35 wt %, preferably less than 30 wt %, more preferably less than 25 wt %, most preferably less than 20 wt %, of granules having a particle size smaller than 75 μm (200 mesh).

Although the present invention is illustrated mostly with a chewable tablet, the chewable composition can be in any chewable form, e.g., a bar or wafer. The present invention is further illustrated by reference to the following example. The example is intended to illustrate desired embodiments and is not intended to limit the scope of the invention.

EXAMPLE

Dry blend 133 kg of guar gum fiber, which is available from Novartis Consumer Health under the trademark BENEFIBER®, 25 kg of confectioner's sugar, available from Imperial Sugar Co, Georgia, and 25 kg of maltodextrin, MALTRIN® M100 in a Fielder high shear, granulator. Add 28 L of purified water over 18 minutes using a fully aspirated fan-type nozzle 9508, which provides a fine spray of water, to form agglomerate granules. The granules are dried using a Fitzpatrick fluid bed dryer at 70° C. until the moisture content of the granules is less than 3 wt %. The dried granules are screened using a 30 mesh (U.S. standard) screen collecting the screened granules to a container. The large granules retained on the screen are conveyed to a Fitzpatrick mill, which is equipped with a 20 mesh screen and run at medium speed. The milled granules are collected in a container. The granule size distribution of the two granules batches are tested, and the combined granules have less than 4 wt % of granules having a particle size larger than 20 mesh and less than 19 wt % of granules having a particle size smaller than 200 mesh.

In a 2 ft$^3$ V-blender, a premix is prepared by loading, after passing through a 20 mesh screen, 0.2 kg of FD&C yellow #6, 2 kg of orange DURAROME, which is available from Firmenich, 1.4 kg of orange cream flavor SD-1002, which is available from Ottens Manufacturing Co., PA, 2.7 kg of citric acid anhydrous granules, which is available from A.E. Staley, IL, 0.5 kg of micronized SUCRALOSE, which is available from Splenda, Inc. The premix is blended for 10 minutes and set aside. In a 20 ft$^3$ V-blender, the two granules and the premix prepared above are loaded. Additionally, 58 kg of soritol (Neosorb p60), which is available from Roquette Corp, IL, and 19.6 kg of dextrates are added, and the mixture is blended for about 10 minutes. Into the mixture, 2.2 kg of magnesium stearate, which is screened with a 30 mesh screen, is added and blended for 5 minutes. Using a rotary tablet machine having a 0.81 inch round flat punch and applying 40-60 kilonewtons of force, compressed tablets are formed. The molded tablets have highly-pleasing organoleptic texture when masticated, unlike tablets prepared with fiber granules having higher percentage of smaller and/or larger granules than specified above. Tablets produced from a granule batch that has more than 10 wt % of granules having a size larger than 850 μm have gritty organoleptic texture, and tablets produced from a granule batch that has more than 35 wt % of granules having a size smaller than 75 μm have dusty or dry, as well as gummy organoleptic texture.

What is claimed is:

1. A chewable fiber composition comprising compressed granules, wherein said granules comprise a water-soluble dietary fiber and said fiber comprises inulin, and said granules have a size distribution of less than 10% by weight of granules having particle size larger than about 850 μm and less than 35% by weight of granules having particle size smaller than about 75 μm.

2. The chewable fiber composition of claim 1, wherein said granules have a size distribution of less than 4% by weight of granules having particle size larger than about 850 μm and less than 20% by weight of granules having particle size smaller than about 75 μm.

3. The chewable fiber composition of claim 1, wherein said water-soluble dietary fiber comprises inulin having an average degree of polymerization of less than 20 monomeric fructose units.

4. The chewable fiber composition of claim 1, wherein said composition further comprises maltodextrin and sorbitol.

5. A chewable fiber composition comprising agglomerated granules, said granules comprising a water-soluble fiber and at least 50 wt % of said water-soluble fiber is inulin having an average degree of polymerization of less than 20 monomeric fructose units.

6. The chewable fiber composition of claim 5, wherein said composition further comprises maltodextrin and sorbitol.

7. A chewable tablet comprising agglomerated granules, wherein said granules comprise a water-soluble inulin fiber having an average degree of polymerization of less than 20 monomeric fructose units, said tablet having a hardness between 10 kp and 20 kp.

8. The chewable tablet according to claim 7 additionally comprising maltodextrin and sorbitol.

9. The chewable composition according to claim 5 wherein said water-soluble fiber consists essentially of agglomerated granules consisting essentially of inulin having an average degree of polymerization of less than 20 monomeric fructose units.

10. A chewable fiber composition comprising compressed granules wherein said granules comprise a water-soluble dietary fiber and said fiber comprises inulin having a degree of polymerization at less that 20 monomeric fructose units, and said granules have a size of distribution of less than 10% by weight of granules having particle size larger than about 850 μm and less than 35% by weight of granules having particle size smaller than about 75 μm.

11. The composition of claim 1, wherein the composition comprises 40 to 60 wt % of the water-soluble dietary fiber.

12. The composition of claim 5, wherein the composition comprises 40 to 60 wt % of the water-soluble fiber.

13. The tablet of claim 7, wherein the tablet comprises 40 to 60 wt % of the water-soluble inulin fiber.

14. The composition of claim 10, wherein the composition comprises 40 to 60 wt % of the water-soluble dietary fiber.

* * * * *